March 23, 1937.  E. H. PIRON  2,074,341
WHEEL
Filed April 9, 1934
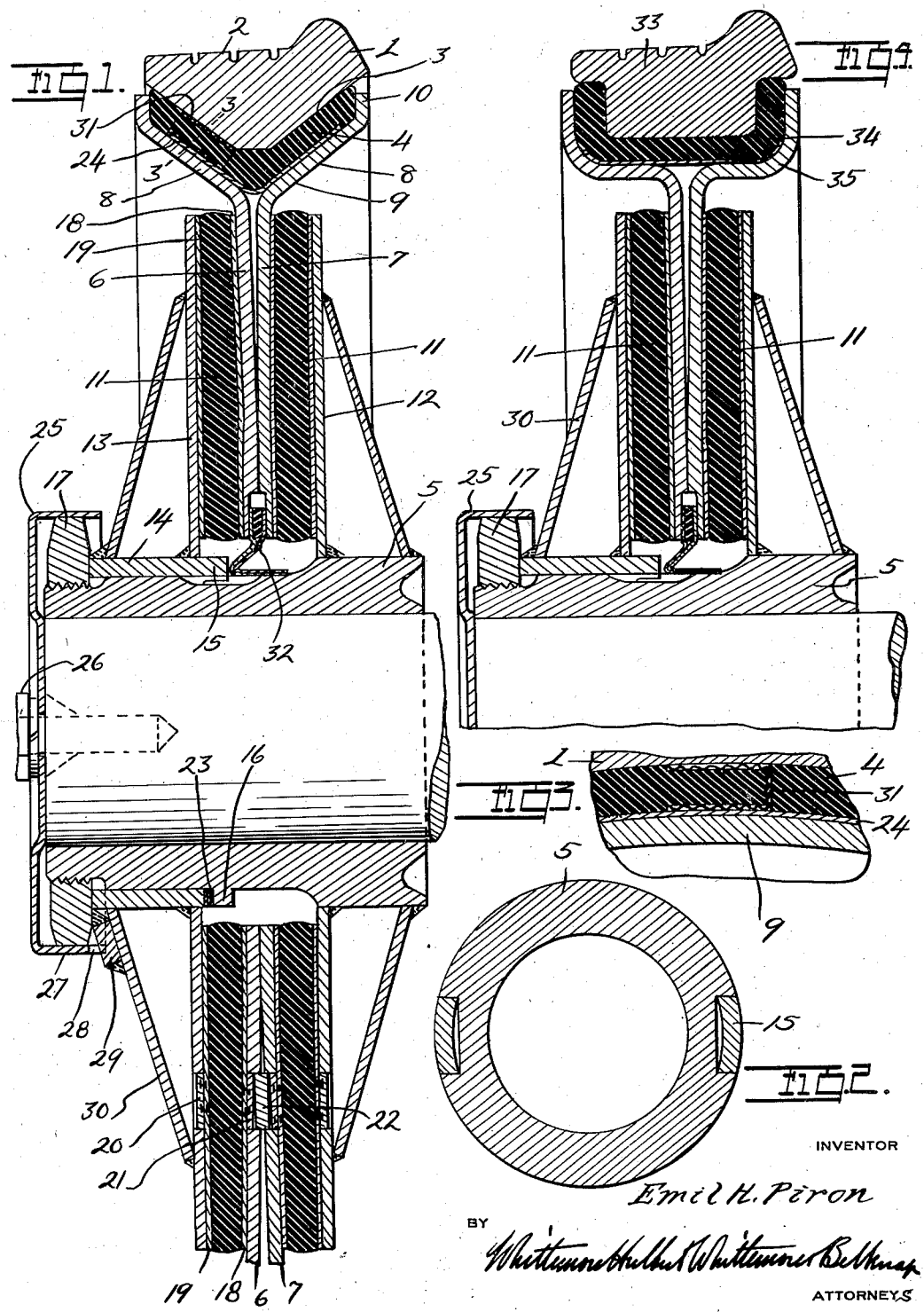
INVENTOR
Emil H. Piron
BY
Whittemore Hulbert Whittemore Belknap
ATTORNEYS Patented Mar. 23, 1937

2,074,341

UNITED STATES PATENT OFFICE 2,074,341

WHEEL

Emil H. Piron, Detroit, Mich., assignor, by mesne assignments, to Transit Research Corporation, New York, N. Y., a corporation of New York Application April 9, 1934, Serial No. 719,759

11 Claims. (Cl. 295—11)

This invention relates to resilient wheels for rail vehicles wherein a metallic rail contacting member is cushioned on and hence sound insulated from the remainder of the wheel.

Numerous attempts have been made to quiet a metallic tread surface as by rubber cushioning, but success over an acceptable period of time has not previously been attained because after a short period of use the space occupied by the rubber as a resilient medium decreases due to the action of one or more of several possible deteriorating influences. I have found that the useful life of the rubber can be lengthened to such an extent that such cushioning becomes commercially feasible if the rubber is maintained under a substantial and continuous compression. It is therefore the primary object of this invention to provide a metallic rail contacting tire and a cushion of rubber or other similar material for supporting the tire from a wheel and to so construct and arrange the tire, wheel and cushion that the cushion will be under a substantial compression, not only upon initial installation but also after prolonged use.

More specifically, it is the object of this invention to provide a wheel composed of opposed disc or plate members which terminate in a flare forming a cushion and tire receiving rim, these members being slightly spaced and somewhat springy so that their yieldable resistance to distortion serves as a continuous pressure imposing means for the cushion.

Other objects and advantages will become hereinafter more fully apparent as reference is had to the accompanying drawing, wherein my invention is illustrated by way of example and not in a limiting sense, and in which Figure 1 is a section through a wheel showing an embodiment of my invention;

Figures 2 and 3 are cross sections on the lines 2—2 and 3—3 respectively of Figure 1;

Figure 4 is a view similar to Figure 1.

As shown in Figures 1, 2 and 3, I is the endless metallic rail contacting tire having the circular tread surface 2 and the V-shaped inner surface 3. 4 is the cushion formed of resilient cushioning material, this cushion being a rubber ring which is V-shaped in cross section.

5 is the hub and 6 and 7 are opposed circular metallic plate or disc members mounted upon and extending radially of the hub and forming the rim for receiving the tire I and the cushion 4. In detail, the plate or disc members terminate in the flared portions 8 forming half rim portions which together form the complete rim. These flared portions have the outwardly diverging portions 9 and the upstanding or radially arranged side walls or flanges 10 at their free edges, the diverging portions together forming the V-shaped bottom portion or base of the rim.

For the purpose of imposing a continuous and substantial pressure on the cushion 4, the plate or disc members 6 and 7 are resilient or springy, but comparatively stiff, and they are formed to normally diverge outwardly from each other from the zone of their inner portions so that they are normally slightly spaced from each other for a substantial portion of their opposed surfaces. These plate or disc members 6 and 7 are urged toward each other by the springing elements 11 and the relatively movable plate members 12 and 13. The springing elements 11 are rubber rings located at opposite sides of the plate or disc members 6 and 7. The plate member 12 is fixedly secured directly to the hub 5 at one end and the plate member 13 is fixedly secured directly to the sleeve 14 which is mounted directly upon the hub 5 at the other end. This sleeve is formed with the diametrically opposite axially extending projections 15 which extend through correspondingly shaped slots in the annular flange 16 upon the hub 5, whereby the sleeve and consequently the plate member 13 are held from rotation relative to the hub. The nut 17 threaded upon the end of the hub 5 and abutting the sleeve 14 is adapted to urge the plate member 13 toward the plate member 12 to thereby urge through the springing elements 11 the plate or disc members 6 and 7 toward each other with a pressure sufficient to impose a continuous and substantial pressure on the cushion 4 when initially assembled and also during operation.

The springing elements 11 support the plate or disc members 6 and 7 in resilient shear and, as shown in the present instance, each of these springing elements is arranged between the inner and outer plate members 18 and 19 respectively. Each spring element is preferably vulcanized to its plate members. The springing elements and plate members are substantially coextensive with the radially extending portions of the plate or disc members 6 and 7, but they terminate short of the portions of these plate or disc members forming the rim and also short of the hub 5 and the sleeve 14. The plate or disc members also terminate short of the hub 5. The arrangement is such, therefore, that the plate or disc members 6 and 7 may move radially relative to the hub 5. Each of the outer plate members 19 is positioned relative to its associated plate member 12 or 13 by the dowels 20 and each of the inner plate members 18 is positioned relative to its adjacent plate or disc member 6 and 7 by the dowels 21. Furthermore, the plate or disc members 6 and 7 are positioned relative to each other by the dowels 22 so that both of these members must move together.

For the purpose of predetermining the pressure exerted upon the springing elements 11 by the relatively movable plate members 12 and 13, the axial inward movement of the sleeve 14 is controlled by the shims 23 which are located between the annular flange 16 and the portions of the ends of the sleeve 14 between the projections 15.

To prevent the cushion 4 from entering the space between the plate or disc members 6 and 7 at the apex of the V-shaped bottom portion or base of the rim, the annular retaining plate 24 of V-shaped cross section is located between the outwardly diverging portions 9 of the plate or disc members and the cushion.

25 is the closure plate or hub cap for the outer end of the hub 5, this closure plate being fixedly secured in place by the bolt 26 and having the peripheral flange 27 which extends over the nut 17 and which is notched at 28 to receive the projection 29 secured to the brace 30 for the plate member 13.

To electrically connect the tire 1 to the hub 5, there are the flexible conductors 31 extending through the cushion 4 and contacting with the tire 1 and the retaining plate 24 and also the electrical conductors 32 secured to and contacting with the inner portions of the plate or disc members 6 and 7 and contacting with the hub 5. With this arrangement, it will be seen that the plate or disc members 6 and 7 also serve in electrically connecting the tire and the hub.

The modification shown in Figure 4 differs from that shown in Figures 1, 2 and 3 in the particular form of the tire 33, the cushion 34 and the rim 35 for receiving the tire and the cushion. The inner portion of the tire, the cushion and the rim are channel shaped in cross section, the bottom portion or base of the rim being substantially cylindrical.

What I claim as my invention is:

1. In a wheel for rail vehicles, a rim of U or V shape in cross section, a metallic tire on said rim, a resilient cushioning material between said tire and said rim adapted to receive the loading of said rim largely in compression, said material being installed under initial compression, and yielding means for maintaining said material under substantial continuous compression.

2. In a wheel for rail vehicles, a multi-part rim, a metallic tire for said rim, a resilient cushioning material between said tire and said rim adapted to receive the loading of said rim largely in compression, the individual parts of said rim being initially spaced from each other and together forming a trough of U or V cross section, and yieldable means for urging said parts toward each other for imposing a continuous pressure on said material.

3. In a wheel for rail vehicles, a multi-part rim having flared side walls, a tire for said rim residing substantially between said side walls, a resilient cushioning material between said rim and said tire in substantially confined relation with respect thereto adapted to receive radial loading largely in compression, the parts of said rim being initially spaced from each other, and yieldable metallic means for urging said parts towards each other to impose a substantial and continuous pressure on said material.

4. In a wheel for rail vehicles, a multi-part rim having side walls and a V-shaped bottom portion, a metallic tire for said rim, a ring of rubber encircling said rim and filling the space between said tire and said rim, the parts of said rim being initially spaced from each other, and comparatively stiff yieldable means for urging said parts together to impose and automatically maintain a continuous pressure on said rubber.

5. In a wheel for rail vehicles, a hub portion, a wheel proper comprising opposed circular members, said circular members each terminating in oppositely disposed flared portions which together comprise a wheel rim, a tire for said rim and a resilient cushioning material between said tire and said rim, said circular members being normally slightly spaced from each other for a substantial portion of their opposed surfaces after placement of said cushioning material in said rim, dowel pins freely disposed in opposing surfaces of said members whereby said plate members are movable laterally with respect to each other and fixed with respect to each other for rotative movement and means for urging said members towards each other to impose a substantial and continuous compression on said cushioning material.

6. In a wheel for rail vehicles, a hub portion, a wheel proper comprising opposed discs radially of said hub portion, said discs each having oppositely disposed half-rim portions integral therewith, said portions together comprising a rim V-shaped in cross section and having side walls radially arranged with respect to said hub, a tire for said rim substantially V-shaped in cross section, a rubber cushion between said tire and said rim also of substantially V-shape in cross section, the two parts of said rim and a substantial amount of the opposed surfaces of said discs being slightly spaced from each other after placement of said discs, said discs being of inherently springy material, and means supported directly by said hub portion for urging said discs toward each other to impose a continuous and substantial pressure on said rubber.

7. In a wheel for rail vehicles, a multi-part rim, a metallic tire for said rim, a resilient cushioning material between said tire and rim, the individual parts of said rim being initially spaced from each other and movable toward and away from each other, a retaining plate between said rim and material, bridging the space between said individual parts and providing metallic surfaces to slide on said rim during relative movement of its parts, and yieldable means for urging said parts toward each other for imposing a continuous pressure on said material.

8. In a rail wheel, a hub portion having a fixed plate radiating therefrom, a collar slidable on said hub portion and having a plate radiating therefrom and integral therewith, conical bracing plates integrally secured to each of said plates and to said hub portion and to said collar respectively, two discs flared at their outer edges to receive a tire residing between said plates, a mass of rubber between said discs and each of said plates supporting said discs in shear, said discs being slightly conical from their inner edges to their tire carrying portions, whereby they are slightly springy toward and away from each other, and dowel means for maintaining said discs against relative rotation.

9. In a rail wheel, a hub portion having a fixed plate radiating therefrom, a collar slidable on said hub portion and having a plate radiating therefrom and integral therewith, conical bracing plates integrally secured to each of said plates and to said hub portion and to said collar respectively, two discs flared at their outer edges to receive a tire residing between said plates, a mass of rubber between said discs and each of said plates supporting said discs in shear, said discs being slightly conical from their inner edges to their tire carrying portions with the inner edges contacting each other and the regions inwardly of said tire carrying portions diverging whereby said discs are springy in a direction toward and away from each other, dowel means between said discs for preventing rotation thereof, a metallic tire encircling said tire carrying portions, a rubber ring between said tire and said tire carrying portions, said discs by their springiness imposing a resilient compression on said rubber, said tire and said tire carrying portions being so shaped as to substantially confine said rubber against flowing outwardly therepast, and means for confining said rubber ring against flowing inwardly of the wheel between said discs.

10. A wheel comprising a hub, a radially extending plate member fixed to the hub, a sleeve on the hub, a radially extending plate member secured to said sleeve and opposed to said first plate member, a tire-carrying member extending between said plate members, springing elements between said plate members and said tire-carrying member comprising rubber discs and thin stiff discs bonded to the faces of said rubber discs, means associated with said members and said stiff discs to prevent relative sliding, interengaging means on the hub and the sleeve for preventing relative rotation, thereof, and means separate from said intergengaging means and engaging said hub and said sleeve for holding said plate members pressed against the sides of said springing elements and for holding said springing elements pressed against said tire-carrying member.

11. A wheel comprising a hub, a radially extending plate member fixed to the hub, a sleeve on the hub, a radially extending plate member secured to said sleeve and opposed to said first plate member, bracing means on the outside of said plate members comprising a dished bracing plate having its periphery welded to said first plate member and its central portion welded to said hub and a second dished bracing plate having its periphery welded to said second plate member and its central portion welded to said sleeve, a tire-carrying member extending between said plate members, springing elements between said plate members and said tire-carrying member comprising rubber discs and thin stiff discs bonded to the faces of said rubber discs, means associated with said members and said stiff discs to prevent relative sliding, interengaging means on the hub and the sleeve for preventing relative rotation thereof, and means separate from said interengaging means and engaging said hub and said sleeve for holding said plate members pressed against the sides of said springing elements and for holding said springing elements pressed against said tire-carrying member.

EMIL H. PIRON.